Aug. 30, 1932.  R. E. KRUEGER  1,875,022

FLUID INJECTOR

Filed Nov. 29, 1929  2 Sheets-Sheet 1

Inventor
Richard E. Krueger
By Arthur H. Durand
Atty.

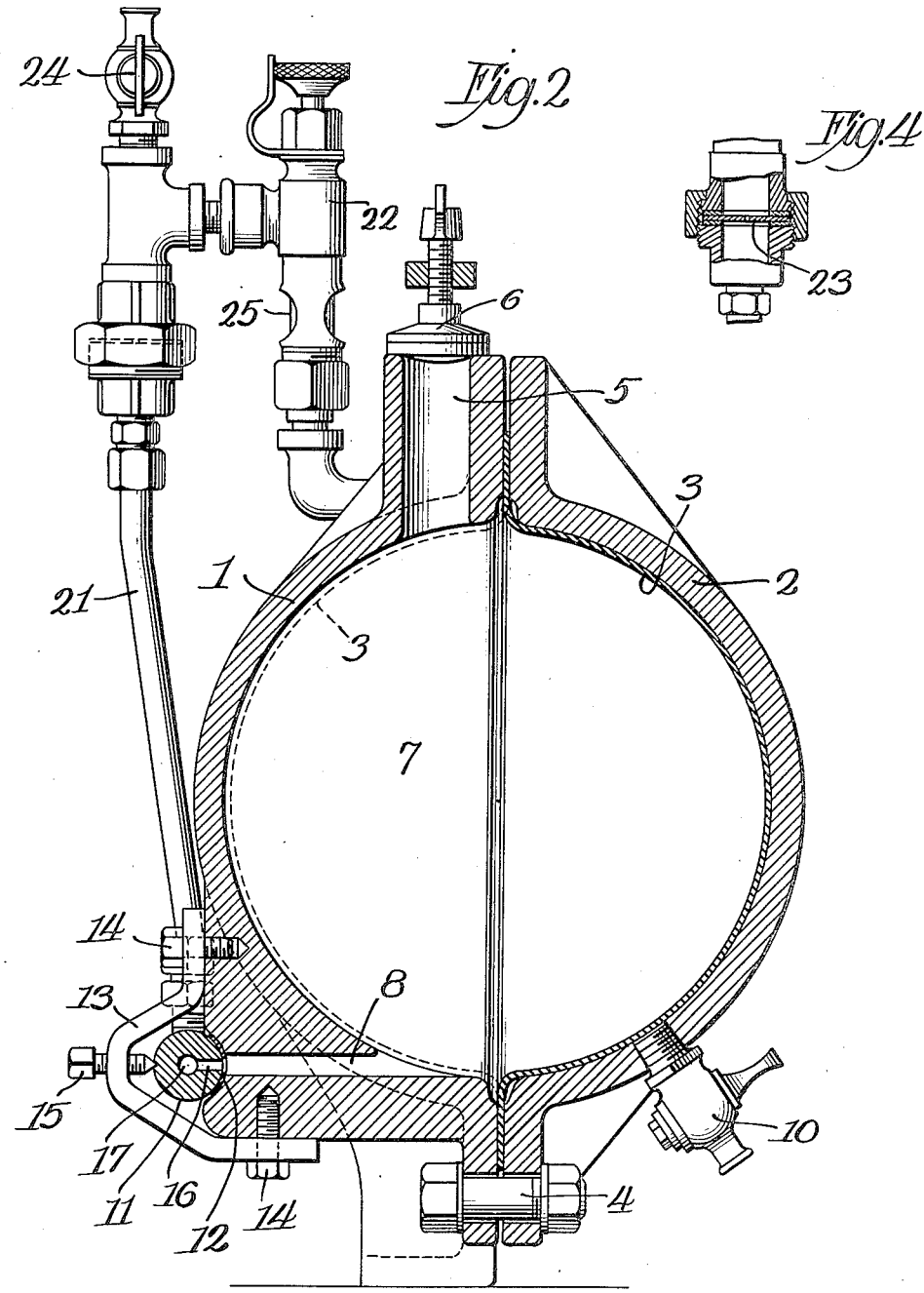

Patented Aug. 30, 1932

1,875,022

UNITED STATES PATENT OFFICE

RICHARD E. KRUEGER, OF MADISON, WISCONSIN, ASSIGNOR TO GENERAL LABORATORIES, INC., OF MADISON, WISCONSIN, A CORPORATION OF DELAWARE

FLUID INJECTOR

Application filed November 29, 1929. Serial No. 410,624.

This invention relates to injectors for injecting one liquid into another, and more particularly to devices of this kind for injecting a disinfectant or purifying liquid, or other liquid, into water, whereby to make the water suitable for domestic use, or for some other purpose.

Generally stated, the object of the invention is to provide a novel and improved construction and arrangement whereby a Venturi tube, or a similar restriction in a water passage, is employed to create a differential in the water pressure, as between two points in the path of travel of the water, whereby the higher pressure is operative to force the liquid out of a reservoir or storage chamber into the water at the point of lower pressure thereof, and to thereby provide an injector of comparatively simple and inexpensive form and construction.

Another object is to provide a novel and improved construction whereby an injector of this character is easily opened for the purpose of inspection or repair, and is easily filled or charged with the liquid to be injected into the water.

Another object is to provide a novel and improved construction whereby the flow of the water is regulated, instead of regulating the flow of the liquid to be injected into the water.

A further object is to provide a novel construction and arrangement whereby the water follows a perfectly straight passage through the injector instead of a circuitous passage.

With the construction shown and described, which is illustrative of the invention, very little, if any, air is entrained within the apparatus, and in this way it is possible to use the injector under rapidly varying conditions of pressure and flow.

It is also an object to provide certain details and features of construction and combinations tending to increase the general efficiency and the desirability of a fluid injector of this particular character.

To the foregoing and other useful ends, the invention consists in the matters hereinafter set forth and claimed and shown in the accompanying drawings, in which—

Fig. 2 is a vertical section on line 2—2 in Fig. 1 of the drawings;

Fig. 4 is a detail sectional view showing a portion of the invention.

Figure 1:
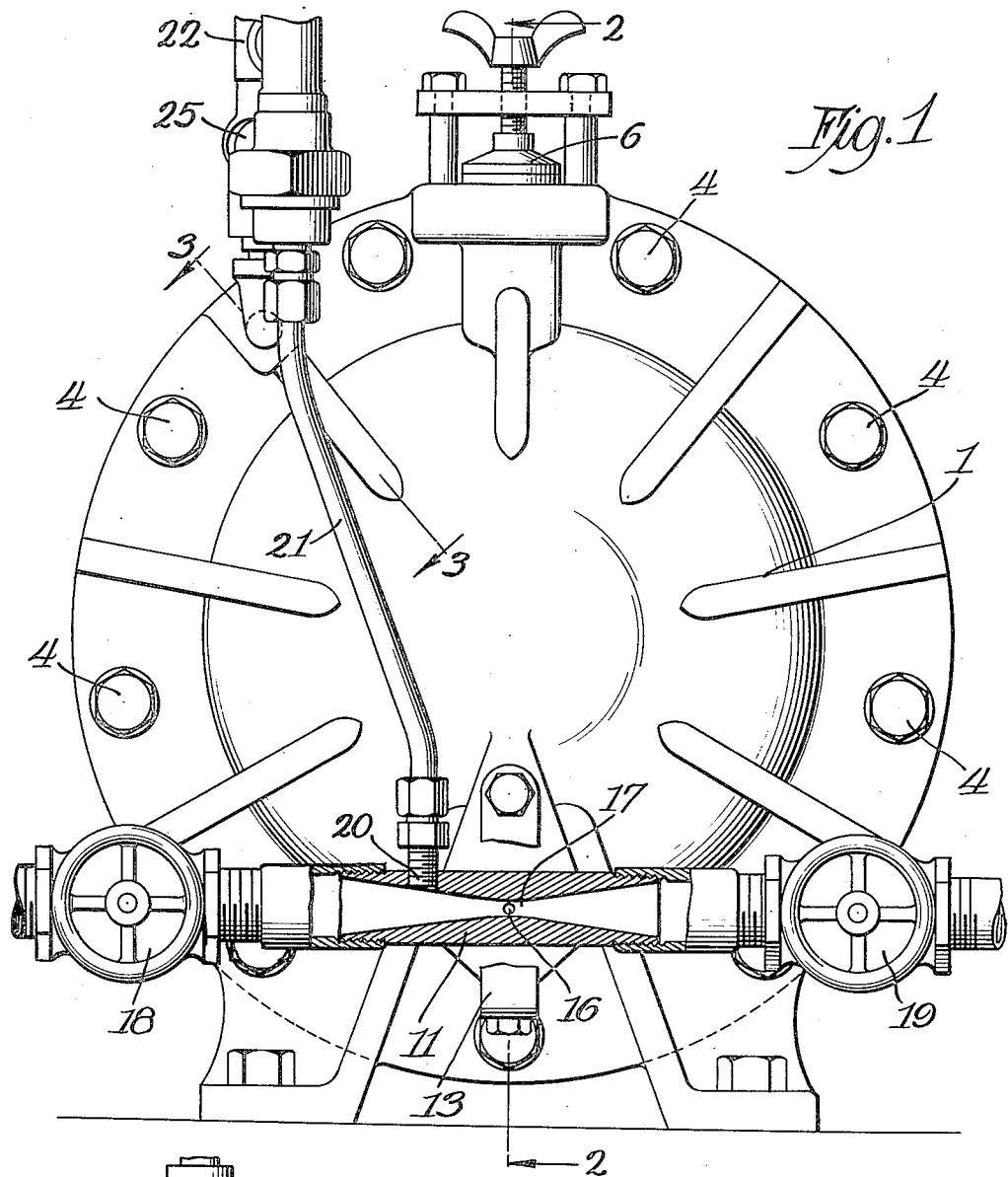
Fig. 1 is a front elevation of an injector involving the principles of the invention, showing certain portions thereof in vertical section.

As thus illustrated, the invention comprises a front section 1, which is preferably concave inside and convex outside, being substantially one-half of a spherical body, the other half being a similarly shaped rear section or cover 2, the two sections being clamped together, with a rubber diaphragm 3 between them, by the clamping bolts 4 that extend through the meeting flanges of the two sections. The section 1 has a top inlet 5 for the liquid to be injected into the water, a suitable closure 6 being provided to seal the top of this opening or inlet, after the substantially spherical reservoir or storage chamber 7 is filled or charged. This chamber has a bottom outlet 8 in the section 1, and the section 2 has a top water inlet 9 and a bottom water outlet 10, or valved drain, whereby the water can be drained out after the disinfectant or other liquid has been discharged through the outlet 8 into the water or other liquid.

A Venturi tube 11 is disposed horizontally and clamped laterally against the seat 12 formed on the lower side of the section 1, this tube being held in position by a clamping bracket 13 secured in place by screws 14 on the section 1, as shown. A set screw 15 is inserted through the bracket 13 to bear against the side of the Venturi tube 11, whereby the latter is easily removable. This tube 11 has a lateral inlet 16 in alignment with the passage 8, previously mentioned, this inlet 16 being at the restricted point 17 in the Venturi tube. The water enters the Venturi tube through the valve 18 in the inlet pipe connection thereto, and escapes from the Venturi tube through the valve 19 at the other end of the tube, whereby the water has a straight course through the injecting device. The Venturi tube 11 has an outlet 20 at a point some distance in advance of the opening 16, previously mentioned, and this outlet 20 is connected by a pipe 21 with the needle valve device 22, which latter is in turn connected with the inlet passage 9, previously mentioned. If desired, a perforated diaphragm or plate 23 can be removably interposed between the pipe 21 and the valve 22, to retard the flow of the water, or as a regulator to proportion the mixture, and this diaphragm 23 can be used either with or without the valve 22, and the latter can be used without the diaphragm, depending upon circumstances. In this way, the water pressure from the outlet 20 through the connections to the inlet 9 can be regulated to suit the requirements.

In a Venturi tube, such as shown, the water pressure will be greater at 20 than at 16, and the differential between these two points is sufficient to cause the water to pass upwardly through the pipe 21 and into the inlet 9, and from the latter into the space between the section 2 and the diaphragm 3, previously mentioned. This pressure continuing, the contents of the chamber 7, which is the space between the diaphragm 3 and the section 1, will be gradually forced out through the outlet 8 and through the passage 16 into the stream of water passing through the Venturi tube, whereby water escaping through the valve 19 will contain the disinfectant or other liquid. There are many liquid preparations, of course, for treating or purifying water, such as the water used for domestic purposes, and such liquid preparations need not be here described, as the invention is not limited to any particular liquid preparation or compound for this purpose.

Figure 3:
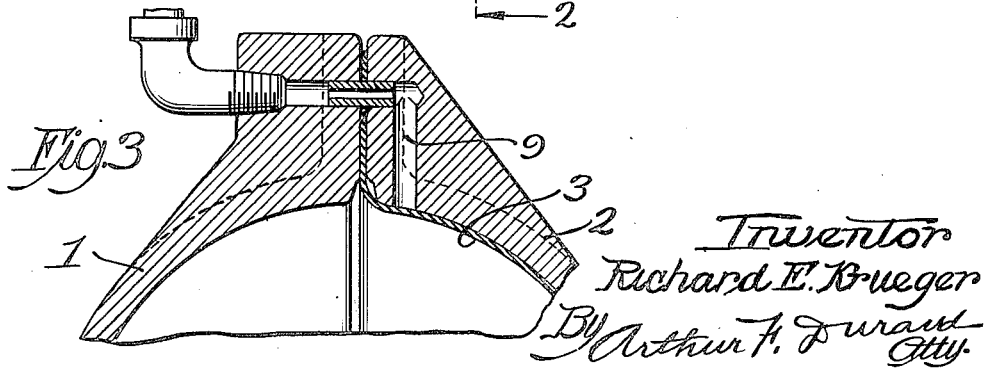
Fig. 3 is a detail fragmentary section on line 3—3 in Fig. 1 of the drawings.

After the chamber 7 has been discharged of its contents, the water can then be shut off, by the valve 18, and by opening the drain valve 10, the water can be discharged from the injector, in a manner that will be readily understood, and when the apparatus is again filled or charged, through the top inlet 5, the diaphragm 3 will then return to the position shown in Figs. 2 and 3 of the drawings.

A small valve 24 can be disposed above the diaphragm 23, at the top of the water connection, as shown, and this valve can be opened to relieve the apparatus of air during the filling operation, and to test the apparatus.

A glass sight tube 25 can be employed in the water connection below the valve 22, so that it can be observed whether the water is flowing downwardly in this connection, in the required manner, after the valves 18, 19 and 22 are opened, and whereby the valve 22 may be adjusted and the effect thereof observed through the glass tube.

The construction shown and described is simple and comparatively inexpensive and facilitates opening the apparatus for inspection or repairs. For example, the back section 2 can be removed by simply removing the nuts from the bolts 4, thus permitting the removal of the diaphragm 3 as well, without breaking or disturbing any of the pipe connections.

The diaphragm 3 is preferably of rubber, or other flexible material, and is preferably molded to normally assume the shape shown in the drawings, whereby this diaphragm normally conforms to the inside contour of the section 2 of the casing. In this way, the diaphragm has no tension or resilience that would tend to force the liquid into the stream of water, so that the water pressure itself is alone responsible for the injection of the liquid into the water. Furthermore, as the diaphragm is practically hat-shaped, it can turn wrong side out, so to speak, and can be made to conform to the interior of the section 1 of the casing when the liquid is entirely discharged into the water, and in such position the diaphragm will remain until forced back into normal position by a refilling or recharging of the liquid reservoir, through the inlet 5, as previously described. The said diaphragm 3, or other suitable pressure responsive means or element, forms a structural separation between one liquid and the other liquid, whereby water cannot pass through the connections 20, 21, 22 and 25 into one compartment, and from the latter into the other compartment, there being a physical or structural separation between the water pressure compartment and the solution compartment, whereby entrapment of air in either or both compartments is unnecessary, and is entirely obviated.

It will be seen that the proportioning of the mixture is done at 23, by the orifices in the thin plate, so that the proportioning is in effect done by the water pressure, or by governing the water pressure itself, on the water pressure side of the diaphragm. Moreover, the solution enters the water at 16, at the point of restriction in the Venturi tube, and this with an injector operating on the flexible diaphragm principle is of considerable importance, as in this way the pressure ahead of the tube and after the tube, or at opposite sides of the restriction in the tube, is substantially the same, the water practically or substantially recovering its full pressure after passing out of the discharge end of the tube. Again, the solution has a perfectly free outlet through the passages 8 and 16 into the Venturi tube, there being no valves, whereby any sediment will pass out freely at the bottom of the container and into the water stream, which is also of considerable importance in a device of this kind. Furthermore, in the construction shown and described, the solution goes into the chamber 7 through the inlet 5, directly from the container in which the solution was shipped, and leaves this chamber 7 through the outlet 8 below. It is also true, in the construction shown and described, that the water goes into the water chamber of the container and casing through the pipe 21 and passage 9, and leaves this water compartment through the valve 10, so that the water can be drained off without forcing any solution into the container or casing at the other side of the diaphragm. Furthermore, with the construction shown and described, the container or casing can be easily unhooked and taken off without removing the Venturi tube from the pipe line, and, in addition, the Venturi tube is supported on and by the container or casing. Again, it will be seen that there is no piping whatever for handling the solution, as the solution is discharged directly from the container or casing into the water stream, and there is in general a minimum amount of piping, which is also advantageous and desirable in an apparatus of this kind. In addition, it is obvious, of course, that the container or casing can be opened without breaking or disturbing any of the water pipe connections, which is another advantage.

What I claim as my invention is:

1. In a liquid injector, the combination of instrumentalities forming a passage for the liquid that is to receive the injection therein of another liquid, having provisions to provide a differential pressure as between two successive points in said passage, and pressure operated means forming a structural separation between one liquid and the other and responsive to and operable by the higher pressure at one point to force the said other liquid into said passage at said other point, said means comprising a hollow body composed of halves separably fastened together, forming a casing having two sections, with a flexible diaphragm clamped between the two sections, all of said instrumentalities and liquid connections being supported on one section, whereby the other section can be removed like a cover without breaking or disturbing any of the liquid connections.

2. In a liquid injector, the combination of instrumentalities forming a passage for the liquid that is to receive the injection therein of another liquid, having provisions to provide a differential pressure as between two successive points in said passage, and pressure operated means forming a structural separation between one liquid and the other and responsive to and operable by the higher pressure at one point to force the said other liquid into said passage at said other point, said means comprising a hollow body composed of halves forming casing sections separably fastened together, one section serving as a cover which can be removed without disturbing any of said instrumentalities.

3. In liquid injection apparatus, the combination with a passage through which a first liquid may be caused to flow, said passage being constructed to provide different liquid pressures at spaced points therein, of a chamber, means within said chamber for separating the latter into two compartments, said means being movable in response to difference in pressure in the two compartments, one of said compartments being adapted to receive a second liquid and being provided with a discharge opening communicating directly with said passage at a point of lower pressure, and means for connecting the other of said compartments with said passage at a point of higher pressure, said passage comprising a Venturi tube, and means for securing said tube directly against said chamber and over the said discharge opening therein.

4. In liquid injection apparatus, a conduit through which a first liquid may be caused to flow, said conduit having a restricted portion therein, an orifice in said conduit adjacent said restricted portion, a container for a second liquid communicating with said orifice, means responsive to pressure of liquid and having connection with said conduit at a point spaced from said restricted portion for forcing said second liquid through said orifice, and means for securing said conduit to said container with said orifice in direct communication with the interior of said container.

5. In a liquid injector, the combination of a separable casing having its interior divided into separate chambers by a flexible diaphragm, means forming a conduit for water under pressure, means forming a restriction in said conduit, an outlet in one casing section from one side of said diaphragm to said conduit at said restriction, and an inlet from the conduit in advance of said restriction through the same casing section to the chamber at the other side of said diaphragm, whereby water pressure at one side of the diaphragm will force the solution at the other side of the diaphragm into said conduit, and means in said water connection at one side of the diaphragm for proportioning the solution, in the discharge thereof into the water, said proportioning means comprising a restriction in said water connection, said casing being separable to permit removal of said diaphragm and one section of the casing without disturbing the positions of the said connections and proportioning means between the conduit and the other casing section.

6. In a liquid injector, the combination of a conduit for water under pressure, means forming a restriction in said conduit, a separable casing having its interior divided into two chambers by a flexible diaphragm, means in one casing section for discharging the solution at one side of said diaphragm into the water stream at the said restriction, and a water connection to the other side of said diaphragm from said conduit at a point in advance of said restriction, through the same casing section whereby the water pressure at one side of the diaphragm causes the solution at the other side of the diaphragm to be discharged into the water stream.

7. In a liquid injector, the combination of a separable casing having its interior divided into two chambers by a flexible diaphragm, means forming a conduit for water under pressure, having a restriction therein, means forming a passage from the bottom of one chamber to the conduit at said restriction, a water connection to the other chamber from said conduit at a point in advance of said restriction, and a drain valve at the bottom of the water chamber, whereby said water chamber can be drained freely without forcing solution into the other chamber, the drain valve section of the casing being removable without disturbing any of the connections between the casing and the conduit.

8. In a liquid injector, the combination of means forming a conduit for water under pressure, having a Venturi tube therein, a casing having its interior divided into two compartments by a flexible diaphragm, means forming a solution discharge passage from one compartment to said Venturi tube at the point of restriction therein, a water connection from the other compartment to said conduit at a point in advance of said restriction, and means for supporting the Venturi tube on the casing, having provisions whereby the casing can be disconnected from the conduit without the necessity of removing the Venturi tube from the conduit.

9. In a liquid injector, the combination of a casing having its interior divided into two compartments by a flexible diaphragm, means forming a conduit for water under pressure, having a restriction therein, means forming a solution discharge passage directly from the bottom of one compartment to said conduit at said restriction, and a water connection from the other compartment to the conduit at a point in advance of said restriction, whereby the water pressure at one side of said diaphragm will cause the discharge of the solution to the water stream, said passage being relatively short to prevent chemical changes in the solution before it reaches the water stream, said casing having means whereby it can be opened to permit the insertion of a tool or brush in said passage for cleaning purposes.

10. In a liquid injector, the combination of a casing having its interior divided into two compartments by a flexible diaphragm, means forming a conduit for water under pressure, having a restriction therein, a solution discharge passage from one compartment to said conduit at said restriction, and a water connection from the other compartment to said conduit at a point in advance of said restriction, said casing having means whereby it can be opened without disturbing or breaking any of the conduit or water connections.

Specification signed this 25 day of November, 1929.

RICHARD E. KRUEGER.